(12) United States Patent
Terry et al.

(10) Patent No.: US 10,470,473 B2
(45) Date of Patent: Nov. 12, 2019

(54) POTATO STORAGE

(71) Applicant: Frito-Lay Trading Company GmbH, Berne (CH)

(72) Inventors: Leon A. Terry, Bedfordshire (GB); Simon Charles McWilliam, Cambridge (GB); Brian Robert Meyer, Leicestershire (GB)

(73) Assignee: FRITO-LAY TRADING COMPANY GMBH (CH)

( * ) Notice: Subject to any disclaimer, the term of this patent is extended or adjusted under 35 U.S.C. 154(b) by 392 days.

(21) Appl. No.: 14/395,372

(22) PCT Filed: Apr. 19, 2013

(86) PCT No.: PCT/EP2013/058219
§ 371 (c)(1),
(2) Date: Oct. 17, 2014

(87) PCT Pub. No.: WO2013/156618
PCT Pub. Date: Oct. 24, 2013

(65) Prior Publication Data
US 2015/0079256 A1 Mar. 19, 2015

(30) Foreign Application Priority Data

Apr. 19, 2012 (GB) .................................. 1206880.5

(51) Int. Cl.
*A23B 7/148* (2006.01)
*A23L 3/3418* (2006.01)
(Continued)

(52) U.S. Cl.
CPC ............ *A23B 7/148* (2013.01); *A23L 3/3418* (2013.01); *A23L 19/10* (2016.08); *A23L 19/12* (2016.08); *A23V 2002/00* (2013.01)

(58) Field of Classification Search
CPC .... A23L 3/361–365; A23L 3/37; A23L 3/375; A23L 3/3418; A23L 19/00;
(Continued)

(56) References Cited

U.S. PATENT DOCUMENTS 3,102,777 A * 9/1963 Bedrosian ................ A23B 4/16
422/40
3,410,696 A * 11/1968 Rosenfield ............... A23B 7/16
426/308
(Continued)

FOREIGN PATENT DOCUMENTS

GB 721208 A * 1/1955
GB 1242412 A 8/1971
(Continued)

OTHER PUBLICATIONS

Voss et al., "Proper Environment for Potato Storage"—Vegetable Research and Information Centre, Jun. 26, 2011, pp. 1-3.
(Continued)

*Primary Examiner* — Drew E Becker
*Assistant Examiner* — Bryan Kim
(74) *Attorney, Agent, or Firm* — Colin P. Cahoon; Shaukat A. Karjeker; Carstens & Cahoon, LLP (57) ABSTRACT

A method of storing potatoes comprises storing a plurality of endodormant or ecodormant potatoes in a first gaseous environment including carbon dioxide in an amount of from greater than the amount of carbon dioxide present in atmospheric air to up to 5 mol % based on the composition of the first gaseous environment; and in a subsequent storage step storing the potatoes in a second gaseous environment including carbon dioxide in an amount of from 0.03 to 2 mol % based on the composition of the second gaseous environment, the first and second gaseous environments having different carbon dioxide contents. The method may com-
(Continued)

prise: monitoring the dormancy of the potatoes; in response to eye movement of a potato, changing the first gaseous environment to a second gaseous environment; maintaining a level of carbon dioxide in the second gaseous environment below a selected threshold to control sugar content of the potatoes.

21 Claims, 2 Drawing Sheets

(51) Int. Cl.
  *A23L 19/10* (2016.01)
  *A23L 19/12* (2016.01)
(58) Field of Classification Search
  CPC ........ A23L 19/03; A23L 19/10; A23L 19/105; A23L 19/12; A23L 19/14; A23V 2002/00
  USPC ................ 426/231, 232, 321, 327, 415, 419
  See application file for complete search history.

(56) References Cited

U.S. PATENT DOCUMENTS

| | | | | |
|---|---|---|---|---|
| 3,508,881 | A * | 4/1970 | Hagenauer | A23L 3/34095 422/62 |
| 4,735,134 | A | 4/1988 | Brouwer | |
| 4,894,997 | A * | 1/1990 | Urushizaki | A23B 7/148 426/419 |
| 5,273,769 | A * | 12/1993 | Lajoie | A23B 9/18 426/319 |
| 5,342,637 | A * | 8/1994 | Kusters | A23B 4/16 426/312 |
| 7,208,187 | B2 * | 4/2007 | Gabler | A23B 7/152 426/231 |
| 2009/0104317 | A1 * | 4/2009 | Clarke | B65D 81/2069 426/118 |
| 2013/0183419 | A1 * | 7/2013 | Knowles | A01N 35/02 426/321 |

FOREIGN PATENT DOCUMENTS

| | | | | |
|---|---|---|---|---|
| WO | | 02069719 | A1 | 9/2002 |
| WO | WO-02069719 | A1 * | 9/2002 | ............ A01N 59/16 |

OTHER PUBLICATIONS

PCT Search Report and Written Opinion for PCT/EP2013/058219, dated Sep. 17, 2013, 11 pages.
Second PCT Search Report and Written Opinion for PCT/EP2013/058219, dated Jun. 3, 2014, 7 pages.
International Preliminary Report on Patentability for PCT/EP2013/058219, dated Sep. 4, 2014, 8 pages.
Khanbari et al., "The effect of controlled atmosphere storage at 4° C on crisp colour and on sprout growth, rotting and weight loss of potato tubers", Potato Research (1994) vol. 37, 291-300.
Burton, "Studies on the dormancy and sprouting of potatoes", New Phytologist (1952) vol. 51, 154-162.
Daniels-Lake et al., "Carbon dioxide and ethylene: a combined influence on potato fry colour", Hort Science (2005), vol. 40(6), 1824-1828.
Mazza et al, "Carbon Dioxide Concentration in Commercial Potato Storages and its Effect on Quality of Tubers for Processing", American Potato Journal, vol. 67, No. 2, 1990, pp. 121-132.
Great Britain Examination Report for Application No. GB1206880.5, dated Sep. 9, 2014, 4 pages.

* cited by examiner

POTATO STORAGE

CROSS REFERENCE TO RELATED APPLICATIONS

This application is a US 371 National Stage application off of PCT Application No. PCT/EP2013/058219, filed Apr. 19, 2013, which claimed priority to Application No. GB1206880.5 filed Apr. 19, 2012, the technical disclosures of which are hereby incorporated by reference in their entirety.

BACKGROUND OF THE INVENTION

Technical Field

The present invention relates to a method of storing potatoes. The present invention also relates to a method of initiating or extending the dormancy of stored ecodormant potatoes. The present invention further relates to a method of controlling the sugar content of stored potatoes.

Description of Related Art

Potatoes can be stored for up to a year but storability is mainly governed by variety and storage regime. There are two phases which dictate the storability of potato; the period of physiological dormancy after harvest (endodormancy) and the period of sprout suppression (ecodormancy).

Dormancy has been defined as "the temporary suspension of visible growth of any plant structure containing a meristem (Lang et al, 1987).

SUMMARY OF THE INVENTION

In this specification, endodormancy refers to the period after tuber initiation, extending for an indeterminate period after harvest, where tuber meristems (eyes) do not sprout and are under the control of physiological factors; and ecodormancy describes any period after endodormancy where the tubers are no longer physiologically dormant but where external environmental factors inhibit growth of the meristem, thereby suppressing sprout growth. The term "eye movement" refers to the early visible stages of growth of tuber meristems which if not suppressed will go on to form sprouts, and in this specification "eye movement" as an indicator of dormancy break means that the tuber meristems have grown to a length of at least 1 mm.

There are several technologies which are employed to initiate and/or extend the ecodormancy of potatoes. For potatoes which are for domestic or table use, tubers are typically stored at low temperature, and optionally in an ethylene containing environment. Such storage conditions may increase the sugar content of the potatoes. For potatoes which are intended to be processed, it is generally important to maintain a low sugar (glucose, fructose and sucrose) content during the storage period, and hence higher storage temperatures in combination with a chemical sprout suppressant is generally employed. As a rule, higher storage temperatures may be preferred to avoid cold-induced sweetening, resulting in an increased sugar content. The most commonly used chemical sprout suppressant is chlorpropham (CIPC). However the presence of detectable residues down the supply chain has led to concerns over possible withdrawal or restrictions. It is recognized that without a viable alternative to CIPC future long-term and year round potato supplies for processing will be threatened.

It has previously been proposed to control the atmosphere within which the potatoes are stored.

There are few studies which have investigated the effect of controlled atmosphere storage on potato tuber physiology and even fewer which have used controlled atmosphere storage at different timings throughout the storage period. One paper, Khanbari, O. S., Thomspon, A. K. (1994) "The effect of controlled atmosphere storage at 4° C. on crisp colour and on sprout growth, rotting and weight loss of potato tubers." *Potato Research* 37, 291-300, disclosed a process which 'cured' potato tubers (variety Record) for three weeks at 10° C. before being transferred to controlled atmosphere storage at 4° C. for six months. Concentrations of 0.7-1.8 mol % $CO_2$ in combination with low $O_2$ (2.1-3.9 mol %) gave the best results with light crisp colour, low sprout growth and few rotted tubers compared with 0.9 mol % $CO_2$ and 21 mol % $O_2$.

Another paper, Burton, W. G. (1959) "The effect of the concentrations of carbon dioxide and oxygen in the storage atmosphere upon the sprouting of potatoes at 10° C." *European Potato Journal* 1, 47-57, found that increasing $CO_2$ concentration was negatively correlated with sprout growth where levels as high as 20 mol % $CO_2$ completely eliminated sprout growth after 4 months at 10° C. This was confirmed many years later by Khanbari and Thompson, (1994) who found higher $CO_2$ resulted in better sprout inhibition, yet, fry colour became darker. Dark fry colour is caused by the Maillard reaction involving the interaction of reducing sugars (glucose and fructose) and amino acids.

A further paper, Gökmen, V., Akbudak, B., Semen, A., Acar, J., Metin Turan, Z., Eris, A. (2007) "Effects of controlled atmosphere storage and low-dose irradiation on potato tuber components affecting acrylamide and color formations upon frying." *European Food Research and Technology* 224, 681-687, investigated the effect of varying ratios of $CO_2$ to $O_2$. Concentrations of $CO_2$ above 9 mol % resulted in significantly higher fructose, glucose and sucrose especially after 4 months storage of potato variety Agria at 9° C. where the levels of sucrose were 5-fold higher than tubers held under 0, 3 and 6 mol % $CO_2$. This same trend was found in variety Russet Burbank.

Burton (1959) also investigated the amount of dissolved gases in the cell sap of the tubers and found that the optimum $CO_2$ concentration for growth to be 2-4 mol % or 0.04-0.05 ml $CO_2$ per ml of potato cell sap whereas inhibition of growth was achieved at much higher $CO_2$ concentrations. The author also found that low $O_2$ stimulated growth especially around 5 mol % which equates to 0.0006 ml $O_2$ per of potato cell sap. It was concluded that since temperature affects the solubility of gases, increasing the storage temperature above 10° C. in an air atmosphere would increase the amount of dissolved gases in the cell sap and the resulting sprout growth may be no more than would be expected as a result of the increased $CO_2$ in solution.

In general, although prior research work generated conflicting data and conclusions it is generally believed in the potato storage art that elevated carbon dioxide levels can (a) inhibit sprouting, but also (b) can correspondingly increase the conversion of starch to sugars, which is generally undesirable and particularly so in processing potatoes.

Controlled atmosphere storage is common practice in extending the storage life of onions. It is known for example that storing onions in low oxygen (3%) and high carbon dioxide (5%) conditions inhibits sprouting; however, levels need to be carefully maintained to prevent anaerobic respiration which causes bad odours. Additionally, controlled atmosphere storage can only be used for storing certain cultivars as side effects include an increase in pungency such that controlled atmosphere storage may not be suitable for mild onion storage. It is disclosed in Chope G. A. et al, "The effect of the transition between controlled atmosphere and regular atmosphere storage on bulbs of onion cultivars SS1, Carlos and Renate", Postharvest Biology Technology, 2007, 44, 228-239, that onions may be transitioned from first to second different atmospheres during storage.

Furthermore, the different physiology of potatoes and onions means that any treatment regime of onions may have a completely different effect when used with potatoes.

Currently, there exists a need in the art for a potato storage regime which, can reduce or avoid the use of CICP or other applied chemical sprout suppressants which may leave residues on the potatoes and which additionally can exhibit the combination of sprout suppression and low sugars (fructose, glucose and sucrose). A potato storage protocol exhibiting the combination of sprout suppression and low sugars in the stored potatoes coupled with reduced or no use of applied chemical sprout suppressants would be a major advance for the potato industry and it is an aim of this invention to provide such a potato storage method.

It is accordingly an aim of this invention to provide a method of storing potatoes which at least partially overcomes at least some of these significant disadvantages of the existing potato storage methods and protocols currently used in the potato industry.

The present invention provides a method of storing potatoes, the method comprising the steps of:
  i. providing a plurality of endodormant or ecodormant potatoes;
  ii. in a first storage step, storing the potatoes in a first gaseous environment, the first gaseous environment including carbon dioxide in an amount of from greater than the amount of carbon dioxide present in atmospheric air to up to 5 mol % based on the composition of the first gaseous environment; and
  iii. in a second subsequent storage step, storing the potatoes in a second gaseous environment, the second gaseous environment including carbon dioxide in an amount of from 0.03 to 2 mol % based on the composition of the second gaseous environment, the first and second gaseous environments having different carbon dioxide contents.

In the first storage step, the amount of carbon dioxide present in atmospheric air may be the amount of carbon dioxide present in the ambient atmospheric air at the particular storage location, and such an amount is greater than 0.03 mol %. The present invention further provides a method of storing potatoes, the method comprising the steps of:
  i. providing a plurality of endodormant or ecodormant potatoes;
  ii. in a first storage step, storing the plurality of potatoes in a first gaseous environment including carbon dioxide;
  iii. monitoring the dormancy of the potatoes or of control potatoes stored in atmospheric air;
  iv. in response to initiation of eye movement of at least one of the potatoes or of at least one control potato stored in atmospheric air, changing the first gaseous environment to a second gaseous environment including carbon dioxide; and
  v. in a second storage step storing the plurality of potatoes in the second gaseous environment and maintaining a level of carbon dioxide in the second gaseous environment below a selected threshold to control the sugar content of the potatoes.

The present invention yet further provides a method of initiating or extending the ecodormancy of stored potatoes, the method comprising the steps of:
  i. storing a plurality of endodormant or ecodormant potatoes in a gaseous environment including carbon dioxide;
  ii. changing the carbon dioxide content of the gaseous environment after eye movement of at least some of the potatoes or at least some control potatoes stored in atmospheric air.

The present invention further provides a method of controlling the sugar content of potatoes, the method comprising the steps of:
  i. in a first storage step storing a plurality of endodormant or ecodormant potatoes in a first gaseous environment including carbon dioxide at a molar content higher than or equal to the carbon dioxide content of atmospheric air; and
  ii. in a second subsequent storage step after dormancy break of at least one of the potatoes or at least one control potato stored in atmospheric air, storing the plurality of potatoes in a second gaseous environment including a lower or higher molar content of carbon dioxide than in the first gaseous environment.

Typically, the sugar content in the potatoes comprises fructose, glucose and sucrose.

The present invention still further provides a method of storing potatoes, the method comprising the steps of:
  i. storing a plurality of endodormant or ecodormant potatoes in a storage facility having a gaseous environment including carbon dioxide at a molar content higher than or equal to the carbon dioxide content of atmospheric air;
  ii. changing the carbon dioxide content of the gaseous environment after eye movement of at least one of the potatoes or at least one control potato stored in atmospheric air.

When control potatoes are employed, the control potatoes are stored in a particular atmosphere, atmospheric air, which may be different from the atmosphere under which, in any particular storage step, the potato crop is being stored under the controlled atmosphere conditions. However, the remaining storage parameters of the control potatoes, such as temperature, storage density, atmospheric pressure, etc. are selected so as to be substantially the same as those of the potato crop being stored; in other words the control storage conditions may vary from the crop storage conditions with respect to composition of the atmosphere only, with other storage parameters or variables being substantially the same.

For all of these inventions, preferred features are defined in the dependent claims.

Compared to known approaches to attempt to store potatoes to achieve sprout growth suppression as discussed above, the present invention can provide the combination of (a) reduced sprout growth and (b) maintenance of low levels of sugars in the stored potatoes.

For domestic or table potatoes, the present invention can permit the potatoes to be stored at higher storage temperatures than those currently conventionally used, reducing the energy footprint of the storage, and/or obviates the need for an ethylene-containing atmosphere or other sprout suppressing chemicals during storage, which provides consumer benefits.

Prior to the present invention, the perceived wisdom in the potato storage industry was that it was necessary to maintain low levels of carbon dioxide, typically from 1500 to 2000 ppm, corresponding to 0.15 to 0.2 mol % in the storage atmosphere, during the ecodormancy period of the potatoes otherwise increased carbon dioxide levels would tend to lead to the problem of increased sugars, such as fructose, glucose and sucrose, in the potatoes. Increased levels of the reducing sugars glucose and fructose are associated with an increase in the incidence of browning during cooking, particularly during frying, and a reduction in, and an increase in the variability of, product quality during the manufacture of potato products such as potato chips.

The present invention is at least partly predicated on the finding by the present inventors that it is the relative levels of carbon dioxide in the storage atmosphere pre- and post-dormancy break (as manifested by eye movement) that are determining factors on whether an elevation in the sugar levels in the stored potatoes is observed.

The inventors have found that by providing a controlled storage atmosphere, including a stage-wise varying content of carbon dioxide, with the carbon dioxide content being changed in response to observed eye movement the ecodormant period of the potatoes during storage can be extended without adversely increasing the levels of sugars in the potatoes. This combined benefit is not derivable intuitively from the state of the art previously disclosed with respect to potato storage. Rather, in the prior art there tended to be a conflict between achieving extended dormancy on the one hand and achieving minimal levels of sugars on the other hand.

By providing extended potato dormancy without increasing sugar levels and by the use of no chemical sprout suppressant (such as CIPC), or a lower level of chemical sprout suppressant (such as CIPC) as compared to known commercially implemented regimes for potato storage, the present invention can provide a number of technical and commercial advantages over the state of the art.

First, the potato storage regime is easier to control in order to reliably and consistently provide a high quality supply of stored potatoes for an extended period after harvesting. The use of eye movement as a control parameter for the variable of storage atmosphere, which may be the single modified variable of the entire storage regime, provides a readily implementable potato storage regime.

Second, the controlled atmosphere potato storage regime of the present invention may be employed as one option to providing an alternative, or a supplement, to the use of a chemical sprout suppressant such as CIPC, if CIPC was to be withdrawn or stricter regulations on its use were to be imposed by food safety regulators.

It is believed, without being bound by any theory, that high carbon dioxide concentrations in the atmosphere after dormancy break results in a stress response which stimulates the breakdown of starch into simple sugars, which increases the reducing sugar content of the tuber. However, to reiterate, it has been shown for the first time that both sprouting can be suppressed and sugar accumulation inhibited if tubers are stored under stage-wise controlled atmosphere storage.

BRIEF DESCRIPTION OF THE DRAWINGS

Embodiments of the present invention will now be described by way of example only, with reference to the accompanying drawings, in which.

DETAILED DESCRIPTION

The present invention relates to a method of storing potatoes. The method comprises the initial step of providing a plurality of ecodormant or endodormant potatoes.

The potatoes are subjected to a storage regime having a controlled atmosphere, in which the gaseous environment within which the potatoes are stored is not constant but is changed in a step-wise manner by switching from a first regime to a second regime. The changeover point is determined by monitoring the nature of the dormancy of the potatoes.

In a first storage step, the potatoes are stored in a first gaseous environment including carbon dioxide in an amount of from 0.03 to 5 mol % based on the composition of the first gaseous environment. The first gaseous environment may comprise atmospheric air or atmospheric air to which additional carbon dioxide has been added (the carbon dioxide displacing other gases present in air). The added carbon dioxide may at least in part be provided by respiratory carbon dioxide emitted from the potatoes.

Typically, the first gaseous environment includes carbon dioxide in an amount of greater than 0.1 to up to 5 mol %, optionally from 0.25 to 5 mol %, further optionally from 0.25 to 1 mol %, based on the composition of the first gaseous environment.

The endodormant or ecodormant potatoes are transferred from the first storage step to a second subsequent storage step after eye movement in at least one of the potatoes. In the present invention, the eye movement as an indicator of dormancy break is defined as meaning that the tuber meristems have grown to a length of at least 1 mm. Such eye movement is visible to the naked eye. The tuber meristems, if not suppressed, would continue to grow and form sprouts in the potatoes.

In some embodiments of the present invention the trigger to switch the storage conditions was the observation of eye movement in at least one of, optionally at least some of, the potatoes.

Typically, the endodormant potatoes are transferred from the first storage step to the second subsequent storage step after eye movement in at least 1%, optionally in from 1 to 50%, of the dormant potatoes.

Alternatively, when control potatoes are employed which are stored in atmospheric air under control conditions otherwise the same as those of the potato crop under controlled storage, as described above, the potatoes are transferred from the first storage step to the second subsequent storage step after eye movement in at least one control potato stored in atmospheric air, optionally in at least some control potatoes stored in atmospheric air, further optionally in from 1 to 50% of a plurality of control potatoes stored in atmospheric air.

In the first storage step, typically the potatoes are stored at a temperature of from 1 to 15° C., optionally from 5 to 13° C. In the second storage step, typically the potatoes are stored at a temperature of from 1 to 15° C., optionally from 5 to 13° C. In both the first and second storage steps, typically the potatoes are stored at substantially the same temperature of from 1 to 15° C., optionally from 5 to 13° C. A typical storage temperature for either or both storage steps is about 9° C.

In preferred embodiments of the invention, the potatoes are transitioned from the first storage step to the second storage step by changing the composition of the gaseous environment, typically in a common storage facility.

In the second subsequent storage step, the potatoes are stored in a second gaseous environment including carbon dioxide in an amount of from 0.03 to 2 mol % based on the composition of the second gaseous environment. The second gaseous environment may comprise atmospheric air, or may comprise atmospheric air to which additional carbon dioxide has been added. Again, the added carbon dioxide may at least in part be provided by respiratory carbon dioxide emitted from the potatoes.

Typically, the second gaseous environment includes carbon dioxide in an amount of from 0.03 to 1.5 mol %, optionally from 0.1 to 1 mol %, based on the composition of the second gaseous environment.

In some preferred embodiments, the second gaseous environment has a lower carbon dioxide content than the first gaseous environment, each carbon dioxide content being based on the molar composition of the respective gaseous environment.

For example, in some embodiments the first gaseous environment includes carbon dioxide in an amount of from 0.25 to 5 mol % based on the composition of the first gaseous environment and the second gaseous environment comprises atmospheric air, or includes carbon dioxide in an amount of from 0.03 to 2 mol % based on the composition of the second gaseous environment.

In one embodiment, the first gaseous environment includes carbon dioxide in an amount of from 0.4 to 4 mol % based on the composition of the first gaseous environment and the second gaseous environment comprises atmospheric air.

In another embodiment, the first gaseous environment includes carbon dioxide in an amount of from 0.4 to 4 mol % based on the composition of the first gaseous environment and the second gaseous environment includes carbon dioxide in an amount of from 0.03 to 0.75 mol % based on the composition of the second gaseous environment.

In some other preferred embodiments, the second gaseous environment has a higher carbon dioxide content than the first gaseous environment, each carbon dioxide content being based on the molar composition of the respective gaseous environment.

For example, in some embodiments the first gaseous environment includes carbon dioxide in an amount of from 0.25 to 0.5 mol % based on the composition of the first gaseous environment and the second gaseous environment includes carbon dioxide in an amount of from greater than 0.5 to up to 1 mol % based on the composition of the second gaseous environment.

For example, in other embodiments the first gaseous environment includes carbon dioxide in an amount of from greater than 0.03 to less than 2 mol % based on the composition of the first gaseous environment and the second gaseous environment includes carbon dioxide in an amount of from greater than 0.3 to up to 2 mol % based on the composition of the second gaseous environment, the carbon dioxide content of the second gaseous environment being higher than that of the first gaseous environment.

Accordingly, in the method of storing potatoes according to preferred embodiments of the invention, the dormancy of the endodormant or ecodormant potatoes stored in the first gaseous environment is monitored and in response to eye movement of at least one of the potatoes or of at least one control potato, the first gaseous environment is changed to the second gaseous environment in which the potatoes are stored while maintaining a level of carbon dioxide in the second gaseous environment below a selected threshold to control the sugar content of the potatoes. The sugar content of the potatoes comprises at least one of fructose, glucose and sucrose.

Optionally, in any of the embodiments of the invention there may be a transition period between the first and second storage steps during which the composition of the gaseous environment is changed, for example progressively. The transition period may take up to 24 hours, but typically may take fewer than 3 hours, for example even as little as 1 hour.

The present invention is illustrated further with reference to the following non-limiting Examples.

Example 1

Potato tubers of the commercially available variety Saturna which had been harvested in the summer of 2010 and had been initially treated with CIPC (chloropropham) growth suppressant were provided. The tubers were ecodormant and had been stored in air at a storage temperature of 9.1° C. The last CIPC treatment had been on 10 Nov. 2010 and on 20 Jan. 2011 the tubers were subjected to controlled atmosphere storage conditions in accordance with the present invention. The tubers were placed in stackable trays and stored in an air tight rigid polypropylene water sealed box (dimensions 88×59×59 cm). The lid of the box was floated on a water reservoir. Gases were regulated and pumped through tubing into the box.

The sample tubers were initially held in an atmosphere comprising air with added carbon dioxide to provide a carbon dioxide content of 0.4 mol % based on the composition of the atmosphere. Tubers were stored within the storage container at a nominal storage temperature of 9.5±1° C., the actual temperature within the container being 10.5° C., for a total of 89 days. The initial day of the controlled storage regime was designated as day 0 (which was 2 Feb. 2011).

A separate population of control tubers of the same variety was stored in air under the same storage containers and temperature.

The control tubers were monitored regularly to determine the break of ecodormancy. The percentage number of control tubers indicating exhibited eye movement (visible growth of a meristematic tissue when stored in air was determined After 5 days (7 Feb. 2011), 19% of the sample tubers in air exhibited eye movement (visible growth of a meristematic tissue, After 9 days (11 Feb. 2011), 57% of the sample tubers in air exhibited eye movement (visible growth of a meristematic tissue).

On day 12 (14 Feb. 2011), the sample tubers were transitioned from the initial atmosphere comprising air with added carbon dioxide into a subsequent different controlled gaseous atmosphere comprising air.

The percentage number of sample tubers exhibiting eye movement was measured at day 49.

The sugar content of the potato tubers was measured at day 0, day 12 and day 49. Equatorial slices of each tuber were taken in triplicate, snap frozen in liquid nitrogen and then stored at −40 and −80° C. for subsequent biochemical analysis. The sugars (fructose, glucose and sucrose) were extracted and quantified using a HPLC-RID (refractive index detector) and peak area in accordance with techniques known in the art. In particular, the slices were freeze dried, then mixed with a methanol:water solution and then filtered through a 0.2 micron filter. The filtrate was passed through a monosaccharide $Ca^+$ (8%) HPLC chromatography column (Rezex RCM), having a mobile phase of HPLC-grade water at a flow rate of 0.6 mL per minute. The extract was then analysed with a refractive index analyser (Agilent 1200 RID) to determine the concentrations of fructose, glucose and sucrose present.

Figure 1:
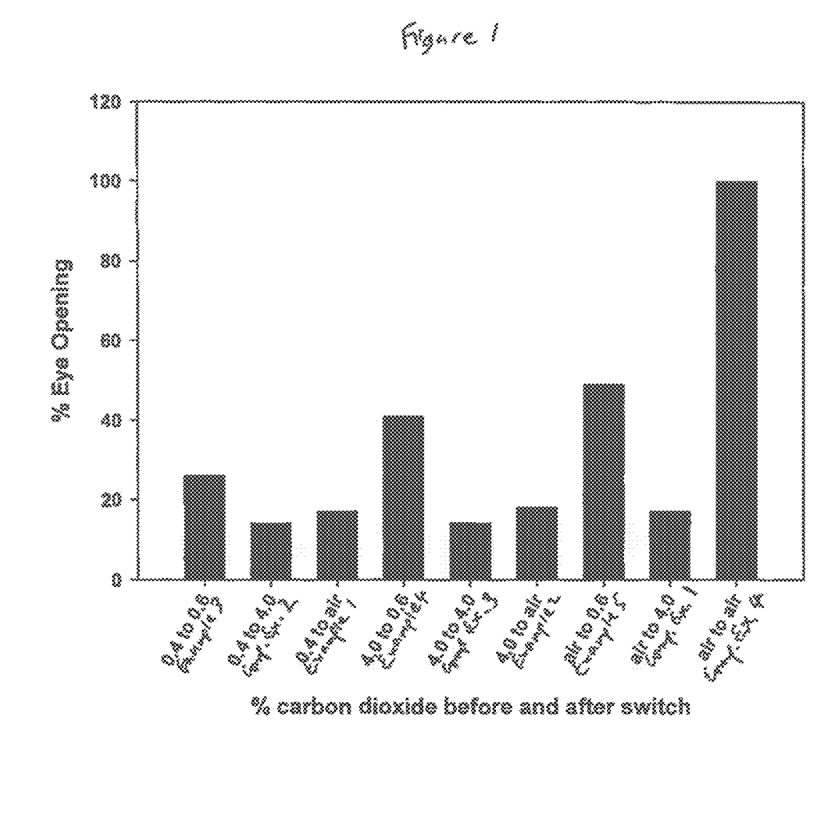
FIG. 1 shows the incidence of potato eye movement after a storage period employed in Examples according to the invention and Comparative Examples.
Figure 2:
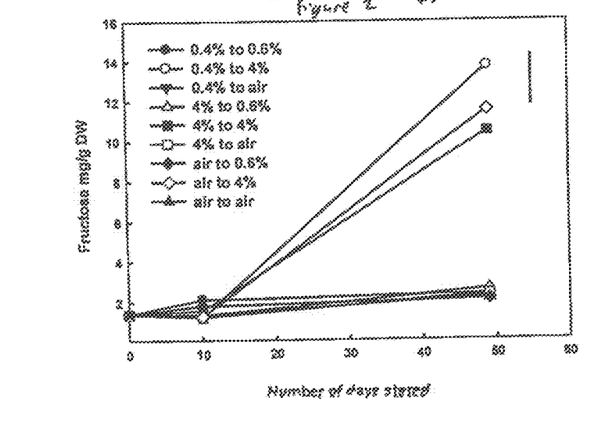
FIG. 2 shows the relationship between the fructose level and the number of days of storage for potatoes stored for different storage periods employed in Examples according to the invention and Comparative Examples.
Figure 3:
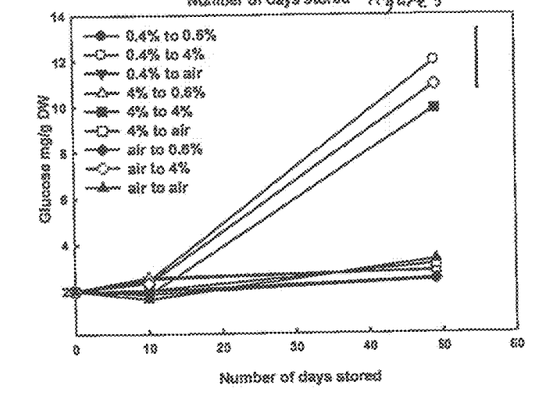
FIG. 3 shows the relationship between the glucose level and the number of days of storage for potatoes stored for different storage periods employed in Examples according to the invention and Comparative Examples.
Figure 4:
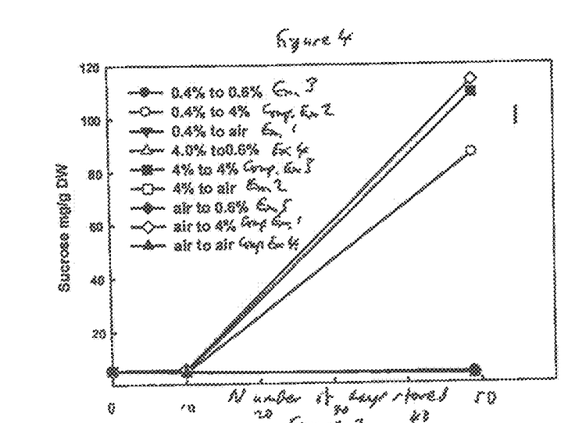
FIG. 4 shows the relationship between the sucrose level and the number of days of storage for potatoes stored for different storage periods employed in Examples according to the invention and Comparative Examples.
Figure 5:
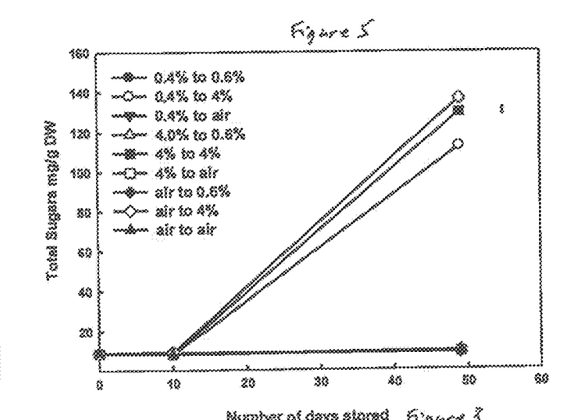
FIG. 5 shows the relationship between the total sugar level and the number of days of storage for potatoes stored for different storage periods employed in Examples according to the invention and Comparative Examples.

FIG. 1 illustrates the percentage of the tubers showing eye movement at day 49. It may be seen that only about 17% of the tubers exhibited eye movement after the 49 day storage period. This demonstrates a high maintenance of ecodormancy over the entire storage period.

FIGS. 2, 3, 4 and 5 respectively illustrate the fructose content, the glucose content, the sucrose content and the total reducing sugar (i.e. the sum of glucose and fructose) content of the tubers as measured at days 0, 12 and 49. It may be seen that all of these sugar contents were substantially stable over the 49 day storage period. This demonstrates substantially negligible increase in reducing sugars over the entire storage period, and in particular substantially no increase in reducing sugars during ecodormancy.

Example 2

Example 2 repeated Example 1 using the same potato tubers but different carbon dioxide contents in the controlled atmosphere storage conditions in accordance with the present invention. The sample tubers were initially held in an atmosphere comprising air with added carbon dioxide to provide a carbon dioxide content of 4 mol % based on the composition of the atmosphere and then transitioned at day 12 (14 Feb. 2011), into a different controlled gaseous atmosphere comprising air.

Again, the percentage of eye movement was measured at day 49 and the reducing sugar content of the potato tubers was measured at day 0, day 12 and day 49.

From FIG. 1 it may be seen that only about 19% of the tubers exhibited eye movement after the 49 day storage period. Again, this demonstrates a high maintenance of ecodormancy over the entire storage period. From FIGS. 2, 3, 4 and 5 it may be seen that all of the sugar contents were substantially stable over the 49 day storage period. Again, this demonstrates substantially negligible increase in sugars over the entire storage period, and in particular substantially no increase in reducing sugars during ecodormancy.

Example 3

Example 3 repeated Example 1 using the same potato tubers but different carbon dioxide contents in the controlled atmosphere storage conditions in accordance with the present invention. The sample tubers were initially held in an atmosphere comprising air with added carbon dioxide to provide a carbon dioxide content of 0.4 mol % based on the composition of the atmosphere and then transitioned at day 12 (14 Feb. 2011), into a different controlled gaseous atmosphere comprising air with added carbon dioxide to provide a carbon dioxide content of 0.6 mol % based on the composition of the atmosphere.

Again, the percentage of eye movement was measured at day 49 and the reducing sugar content of the potato tubers was measured at day 0, day 12 and day 49.

From FIG. 1 it may be seen that only about 27% of the tubers exhibited eye movement after the 49 day storage period. Again, this demonstrates a high maintenance of ecodormancy over the entire storage period. From FIGS. 2, 3, 4 and 5 it may be seen that all of the sugar contents were substantially stable over the 49 day storage period. Again, this demonstrates substantially negligible increase in sugars over the entire storage period, and in particular substantially no increase in reducing sugars during ecodormancy.

Example 4

Example 4 repeated Example 1 using the same potato tubers but different carbon dioxide contents in the controlled atmosphere storage conditions in accordance with the present invention. The sample tubers were initially held in an atmosphere comprising air with added carbon dioxide to provide a carbon dioxide content of 4 mol % based on the composition of the atmosphere and then transitioned at day 12 (14 Feb. 2011), into a different controlled gaseous atmosphere comprising air with added carbon dioxide to provide a carbon dioxide content of 0.6 mol % based on the composition of the atmosphere.

Again, the percentage of eye movement was measured at day 49 and the reducing sugar content of the potato tubers was measured at day 0, day 12 and day 49.

From FIG. 1 it may be seen that about 42% of the tubers exhibited eye movement after the 49 day storage period. Again, this demonstrates a reasonable maintenance of ecodormancy over the entire storage period. From FIGS. 2, 3, 4 and 5 it may be seen that all of the reducing sugar contents were substantially stable over the 49 day storage period. Again, this demonstrates substantially negligible increase in sugars over the entire storage period, and in particular substantially no increase in reducing sugars during ecodormancy.

Example 5

Example 5 repeated Example 1 using the same potato tubers but different carbon dioxide contents in the controlled atmosphere storage conditions in accordance with the present invention. The tubers were initially held in an atmosphere comprising air and then transitioned at day 12 (14 Feb. 2011), into a different controlled gaseous atmosphere comprising air with added carbon dioxide to provide a carbon dioxide content of 0.6 mol % based on the composition of the atmosphere.

Again, the percentage of eye movement was measured at day 49 and the sugar content of the potato tubers was measured at day 0, day 12 and day 49.

From FIG. 1 it may be seen that about 50% of the tubers exhibited eye movement after the 49 day storage period. Again, this demonstrates a reasonable maintenance of ecodormancy over the entire storage period. From FIGS. 2, 3, 4 and 5 it may be seen that all of the sugar contents were substantially stable over the 49 day storage period. Again, this demonstrates substantially negligible increase in sugars over the entire storage period, and in particular substantially no increase in reducing sugars during ecodormancy.

Comparative Examples 1 to 3

Comparative Examples 1 to 3 each repeated Example 1 using the same potato tubers but different carbon dioxide contents in the controlled atmosphere storage conditions which were not in accordance with the present invention. In Comparative Examples 1 to 3 the sample tubers were initially held in an atmosphere comprising, respectively, air, air with added carbon dioxide to provide a carbon dioxide content of 0.4 mol % based on the composition of the atmosphere, or air with added carbon dioxide to provide a carbon dioxide content of 4 mol % based on the composition of the atmosphere. In each of Comparative Examples 1 to 3 the tubers were then transitioned at day 12 (14 Feb. 2011), into a different controlled gaseous atmosphere comprising air with added carbon dioxide to provide, in each case, a carbon dioxide content of 4 mol % based on the composition of the atmosphere.

Again, for each Comparative Example the percentage of eye movement was measured at day 49 and the reducing sugar content of the potato tubers was measured at day 0, day 12 and day 49.

From FIG. 1 it may be seen that while for each Comparative Example only about 19, 14, or 14% respectively of the tubers exhibited eye movement after the 49 day storage period, which demonstrated a high maintenance of ecodormancy over the entire storage period, nevertheless from FIGS. 2, 3, 4 and 5 it may be seen that all of the sugar contents were substantially increased over the 49 day storage period.

These Comparative Examples demonstrate that a significant increase in sugars over the entire storage period results from providing a significant carbon dioxide concentration in the atmosphere during ecodormancy.

Comparative Example 4

Comparative Example 4 repeated Example 1 using the same potato tubers but different carbon dioxide contents in the controlled atmosphere storage conditions which were not in accordance with the present invention. In Comparative Example 4 the tubers were held in an atmosphere comprising air throughout the entire 49 day storage period.

Again, for Comparative Example 4 the percentage of eye movement was measured at day 49 and the reducing sugar content of the potato tubers was measured at day 0, day 12 and day 49.

From FIG. 1 it may be seen that for Comparative Example 4 100% of the tubers exhibited eye movement after the 49 day storage period, which demonstrated a negligible maintenance of ecodormancy over the entire storage period. Although FIGS. 2, 3, 4 and 5 show all of the sugar contents were substantially constant over the 49 day storage period, nevertheless the lack of ecodormancy would limit the storage ability of the potatoes stored solely in air.

These Examples and Comparative Examples cumulatively demonstrate that the controlled atmosphere regime of the present invention, achieved by stage-wise varying the carbon dioxide concentration in the atmosphere by switching between two different regimes, can achieve the combination of a significant extension of ecodormancy yet without any significant increase in sugars over the storage period.

These Examples and Comparative Examples also cumulatively demonstrate that the sucrose, glucose and fructose concentrations for tubers treated with 4 mol % carbon dioxide in the latter stages of storage between day 12 and day 49 showed a rapid increase in all sugars which were approximately 20-, 6-, 8- and 14-fold higher than the air-air control of Comparative Example 4 and the lower % carbon dioxide employed in the ecodormancy period after day 12 for Examples 1 to 5. Tubers held under the treatment regimes of Examples 1 to 5 which did not include the 4 mol % carbon dioxide in the second stage of storage contained sugar concentrations in line with the control (air/air) tubers.

The treatments held in 0.6 mol % carbon dioxide in the latter stage of storage had higher % eye movement than the other treatment regimes irrespective of the treatment before the initiation of eye movement. Generally, however, sprouting was inhibited in tubers which had initially received higher carbon dioxide concentrations.\

Various modifications to the present invention will be readily apparent to those skilled in the art and are encompassed within the scope of the present invention. In particular, although switching between only two controlled atmosphere regimes has been exemplified, the various methods of the present invention may include successive switching between more than two controlled atmosphere regimes, for example from first to second to third regimes, each having a respective carbon dioxide content in the controlled atmosphere.

The invention claimed is:

1. A method of storing potatoes, the method comprising the steps of:
   i. providing a plurality of endodormant or ecodormant potatoes;
   ii. in a first storage step, storing the potatoes in a first gaseous environment, the first gaseous environment including carbon dioxide in an amount of from 0.25 to 5 mol % based on the composition of the first gaseous environment;
   iii. transitioning to a second storage step after eye movement of at least one stored potato, or at least one control potato stored in atmospheric air; and
   iv. in a second subsequent storage step, storing the potatoes in a second gaseous environment, the second gaseous environment including carbon dioxide in an amount of from 0.1 to 1.0 mol % based on the composition of the second gaseous environment, the first and second gaseous environments having different carbon dioxide contents;
   wherein the method is carried out at a temperature in the range from 1 to 15° C.

2. A method according to claim 1 wherein the first gaseous environment comprises atmospheric air to which additional carbon dioxide has been added.

3. A method according to claim 1 wherein the second gaseous environment comprises atmospheric air to which additional carbon dioxide has been added.

4. A method according to claim 1 wherein the second gaseous environment has a lower carbon dioxide content than the first gaseous environment, each carbon dioxide content being based on the molar composition of the respective gaseous environment.

5. A method according to claim 1 wherein the first gaseous environment includes carbon dioxide in an amount of from 0.4 to 4 mol % based on the composition of the first gaseous environment and the second gaseous environment comprises atmospheric air to which carbon dioxide has been added.

6. A method according to claim 1 wherein the second gaseous environment has a higher carbon dioxide content than the first gaseous environment, each carbon dioxide content being based on the molar composition of the respective gaseous environment.

7. A method according to claim 6 wherein the second gaseous environment includes carbon dioxide in an amount of from greater than 0.5 to up to 1 mol % based on the composition of the second gaseous environment.

8. A method according to claim 1 wherein in step i the potatoes are endodormant.

9. A method according to claim 1 wherein the potatoes are transferred from the first storage step to the second subsequent storage step after eye movement in from 1 to 50% of the stored potatoes or control potatoes.

10. A method according to claim 1 wherein the potatoes are transitioned from the first storage step ii to the second storage step iii by changing the first gaseous environment to the second gaseous environment in a common storage facility.

11. A method of storing potatoes, the method comprising the steps of:
  i. storing a plurality of endodormant or ecodormant potatoes in a storage facility having a first gaseous environment including carbon dioxide at a molar content in an amount of greater than 0.25 to up to 5 mol %;
  ii. transitioning to a second storage step after eye movement of at least one stored potato, or at least control potato stored in atmospheric air; and
  iii. changing the carbon dioxide content of the first gaseous environment to a second gaseous environment having from 0.1 to 1.0 mol % carbon dioxide after eye movement of at least one of the stored potatoes or at least one control potato stored in atmospheric air;
  wherein the method is carried out at a temperature in the range from 1 to 15° C.

12. A method according to claim 11 wherein step ii is initiated after eye movement in at least some of the stored potatoes or the control potatoes.

13. A method according to claim 11 wherein in step i the first gaseous environment comprises atmospheric air to which additional carbon dioxide has been added.

14. A method according to claim 11 wherein in step ii the second gaseous environment comprises atmospheric air to which additional carbon dioxide has been added.

15. A method according to claim 11 wherein the gaseous environment in step i includes carbon dioxide in an amount of from 0.4 to 4 mol % based on the composition of the gaseous environment.

16. A method according to claim 11 wherein the gaseous environment in step ii has a higher carbon dioxide content than the gaseous environment in step i, each carbon dioxide content being based on the molar composition of the respective gaseous environment.

17. A method according to claim 11 wherein the potatoes are transitioned from the first step i to the second step ii by changing the first gaseous environment to the second gaseous environment in a common storage facility.

18. The method of claim 1 wherein the second subsequent storage step comprises maintaining a level of carbon dioxide below a selected threshold to control the sugar content of the potatoes.

19. The method of claim 1 comprising after the first storage step a step of monitoring the dormancy of the stored potatoes or of control potatoes stored in atmospheric air.

20. The method according to claim 11 wherein the storing step i comprises storing in a storage facility having the first gaseous environment.

21. The method according to claim 12 wherein step ii is initiated after eye movement in from about 1-50% of the potatoes or the stored control potatoes.

* * * * *